Sept. 22, 1959      P. N. KOKKO      2,905,018
COLLAPSIBLE STEERING COLUMN
Filed Jan. 20, 1956

INVENTOR.
PAUL N. KOKKO
BY
McMorrow, Berman & Davidson
ATTORNEYS

2,905,018

COLLAPSIBLE STEERING COLUMN

Paul N. Kokko, Pelkie, Mich.

Application January 20, 1956, Serial No. 560,338

1 Claim. (Cl. 74—493)

This invention relates to vehicle steering wheel assemblies, and more particularly to an improved collapsible steering wheel assembly for a motor vehicle.

The main object of the invention is to provide a novel and improved collapsible motor vehicle steering wheel assembly which is simple in construction, which is easy to install, and which is provided with means for maintaining the steering wheel element thereof in a normally elevated position, but which is arranged to yield to allow the steering wheel element to be depressed when force is applied thereto, for example, in the event of a collision or other accident.

A further object of the invention is to provide an improved collapsible steering wheel assembly for motor vehicles, said assembly involving inexpensive components, being durable in construction, and being arranged so that the steering wheel element thereof is readily yieldable when a force is applied thereto, such as in the event of a collision with another vehicle, or other impact, whereby the operator of the vehicle is thrown against the steering wheel, the improved collapsible wheel assembly thus providing protection against injury to the operator of the vehicle from contact with the steering wheel element.

Further objects and advantages of the invention will become apparent from the following description and claims, and from the accompanying drawings, wherein:

Figure 1:
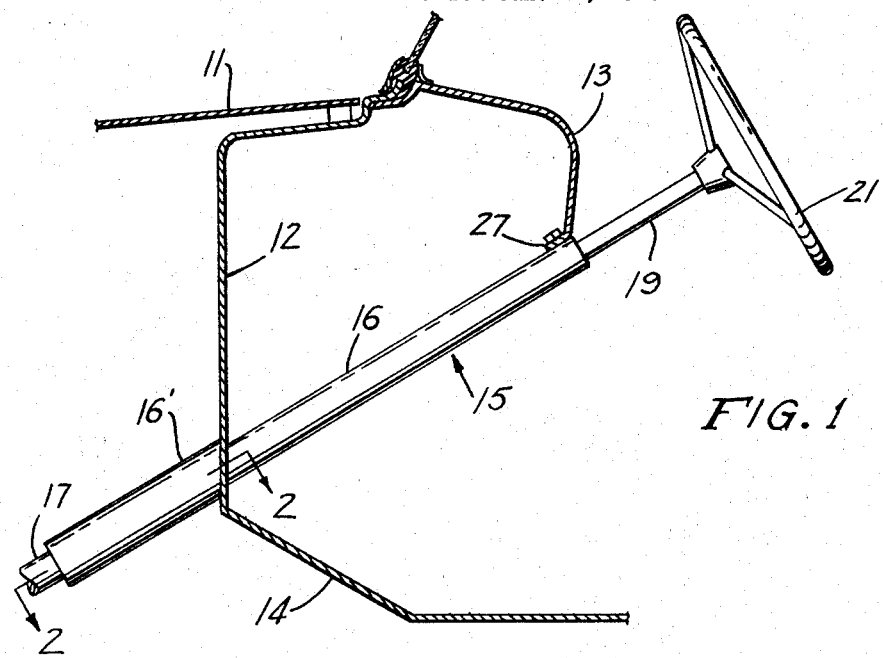
Figure 1 is a fragmentary vertical cross sectional view taken through the forward portion of the driver's compartment of a motor vehicle, showing an improved steering wheel assembly according to the present invention, in side elevational view.

Referring to the drawings, 11 designates a conventional motor vehicle having an operator's compartment including a fire wall 12, an instrument panel 13, and a floorboard 14, as shown in Figure 1. Designated generally at 15 is a steering wheel assembly which comprises a sleeve-like bracket 16 secured to the vertical fire wall 12 and extending upwardly and rearwardly therefrom. Designated at 17 is a tubular shaft which is rotatably mounted axially with respect to the sleeve member 16, by any suitable means, the steering shaft 17 being connected at its lower end to the usual steering mechanism. The shaft 17 is formed with the splined internal bore 18 at its upper end position, as shown in Figure 2, and slidably and non-rotatably engaged in the splined internal bore 18 of shaft 17 is the lower end portion of a post element 19, the post element having the longitudinal splines 20 thereon which interfit with and are slidable in the splined bore 18 of shaft 17.

Secured to the top end of the post element 19 is the conventional steering wheel 21.

Figure 2:
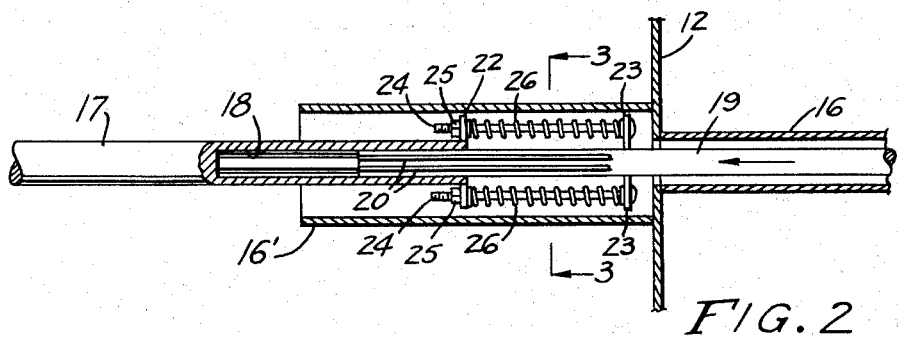
Figure 2 is an enlarged cross sectional detail view taken on the line 2—2 of Figure 1.
Figure 3:
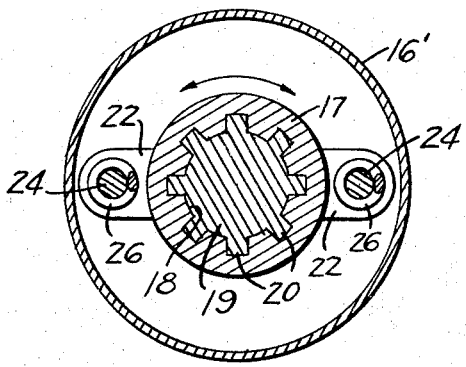
Figure 3 is an enlarged transverse cross sectional view taken on the line 3—3 of Figure 2.

The top end portion of the tubular shaft 17 is provided with a pair of diametrically opposed outwardly projecting lugs 22, 22, located symmetrically on opposite sides of the longitudinal vertical plane containing the axis of said shaft, and the post element 16 is provided with a similar pair of diametrically opposed outwardly extending lugs 23, 23 spaced from the lugs 22, 22 and facing said lugs 22, 22, as shown in Figure 2. Engaged through the respective opposing pairs of lugs 22, 23 are respective bolts 24 provided with nuts 25 thereon located subjacent the lugs 22, to retain the bolts on the lugs. Respective coiled springs 26, 26 surround the bolts 24, 24 and bear between the respective pairs of lugs 22, 23, as shown in Figure 2, biasing the post element 19 upwardly, in a direction which is parallel to the axis of the tubular shaft 17, namely axially and outwardly from the tubular shaft.

As is shown in Figure 1, the bracket member 16 is secured at its upper end to the bottom flange 27 of the instrument panel 13 and is aligned with a sleeve 16' attached to the fire wall 12. The sleeve 16 thus surrounds the post element 19, as shown in Figure 2, whereas the coiled springs 26, 26 are contained within the enlarged lower sleeve element 16', whereby the enlarged lower sleeve element 16' protects the springs and also prevents dirt or other foreign material from entering the splined bore 18.

As will be readily apparent, when a downward force is applied on the steering wheel element 21, the post element 19 telescopes through the splined bore 18, allowing the steering wheel 21 to be depressed, the movement of the steering wheel being opposed by the springs 26, 26 but the springs being sufficiently yieldable to allow the steering wheel to descend when substantial force is applied to the steering wheel. Thus, the springs 26 are sufficiently yieldable to allow the steering wheel to be depressed when the operator's body is thrown thereagainst in the event of a collision or other emergency, thus preventing injury to the operator.

While a specific embodiment of an improved vehicle steering wheel assembly has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a vehicle steering wheel assembly, sleeve-like bracket means, a tubular shaft rotatably mounted coaxially with said bracket means, said tubular shaft being formed with a splined internal bore, a splined post element slidably and non-rotatably engaged in said splined internal bore of said shaft and extending axially through said bracket means, a steering wheel secured to the end of said post element, a pair of diametrically opposed lugs secured to said post element inside said sleeve-like bracket means and being spaced longitudinally from one end of said shaft, respective opposed lugs secured to said one end of the shaft and being aligned with and facing the first-named lugs, said second-named lugs being also located within said sleeve-like bracket means, respective coiled springs inside said sleeve-like bracket means and mounted between the lugs on the post element and the lugs on said end of the shaft and biasing said post element axially outwardly from said one end of said tubular shaft, and respective bolt members extending parallel to the post element through the aligned lugs and through the coiled springs mounted therebetween, acting to maintain said springs in axial alignment with the aligned lugs and parallel to the axis of said post element, said first and second-named lugs, coiled springs and bolt members being located symmetrically on opposite sides of the axis of said bracket means, shaft and post element.

(References on following page)

References Cited in the file of this patent

UNITED STATES PATENTS

| | | |
|---|---|---|
| 287,634 | Croft | Oct. 30, 1883 |
| 1,647,903 | Cook | Nov. 1, 1927 |
| 2,471,244 | Self | May 24, 1949 |
| 2,625,838 | Dillard | Jan. 20, 1953 |
| 2,639,626 | Snyder | May 26, 1953 |
| 2,716,355 | Schmid | Aug. 30, 1955 |
| 2,779,208 | Pittman et al. | Jan. 29, 1957 |

FOREIGN PATENTS

| | | |
|---|---|---|
| 602,209 | France | Dec. 21, 1925 |